United States Patent [19]

Basile

[11] 4,125,140

[45] Nov. 14, 1978

[54] ACCESS PANEL FASTENER

[75] Inventor: Peter A. Basile, Edison, N.J.

[73] Assignee: Amerace Corporation, New York, N.Y.

[21] Appl. No.: 870,801

[22] Filed: Jan. 19, 1978

Related U.S. Application Data

[63] Continuation of Ser. No. 635,699, Nov. 26, 1975, abandoned.

[51] Int. Cl.$^2$ ............................................. F16B 43/00
[52] U.S. Cl. ......................................... 151/69; 85/8.8; 24/217 R
[58] Field of Search ................ 85/1 K, 8.8; 151/69, 151/41.75; 285/318, 321, 322; 24/217 R; 279/41 R, 79

[56] References Cited

U.S. PATENT DOCUMENTS

| Re. 9,737 | 5/1881 | Whittemore | 85/8.8 X |
|---|---|---|---|
| 722,814 | 3/1903 | Conroy | 85/8.8 X |
| 800,651 | 2/1905 | Janney | 279/79 X |
| 2,144,553 | 1/1939 | Simmonds | 85/8.8 X |
| 2,320,360 | 6/1943 | Grey | 24/217 R X |
| 2,393,550 | 1/1946 | Meinert | 279/79 X |
| 2,631,872 | 3/1953 | Wurmser | 85/8.8 X |
| 2,660,913 | 12/1953 | Frisby | 85/8.8 |
| 2,896,496 | 7/1959 | Jansen | 285/322 X |
| 2,925,802 | 2/1960 | White | 85/8.8 X |
| 3,066,581 | 12/1962 | Goldbeck | 85/8.8 X |
| 3,085,820 | 4/1963 | Pollia | 85/8.8 X |
| 3,137,336 | 6/1964 | Wing | 151/69 X |
| 3,217,774 | 11/1965 | Peluchino | 151/69 |
| 3,289,726 | 12/1966 | Sauter | 151/69 |
| 3,415,302 | 12/1968 | Beck | 151/69 |

FOREIGN PATENT DOCUMENTS

| 1,061,547 | 7/1959 | Fed. Rep. of Germany | 85/8.8 |
|---|---|---|---|
| 1,526,136 | 4/1968 | France | 151/69 |
| 1,291,121 | 9/1972 | United Kingdom | 151/7 |

*Primary Examiner*—Thomas J. Holko
*Attorney, Agent, or Firm*—S. Michael Bender; Richard A. Craig

[57] ABSTRACT

An access panel fastener in which a threaded fastener element is captured within an annular retainer affixed to the access panel and is movable axially relative to the retainer between a securing position and a hold-out position. A plurality of jaws in the retainer are resiliently biased radially inwardly by a surrounding cochlear spring to retain the fastener element in the hold-out position and enable ready movement of the fastener element past the jaws to the securing position. The access panel fastener includes a complementary threaded fastener having a self-locking mechanism which utilizes a collar of synthetic resin material.

27 Claims, 10 Drawing Figures

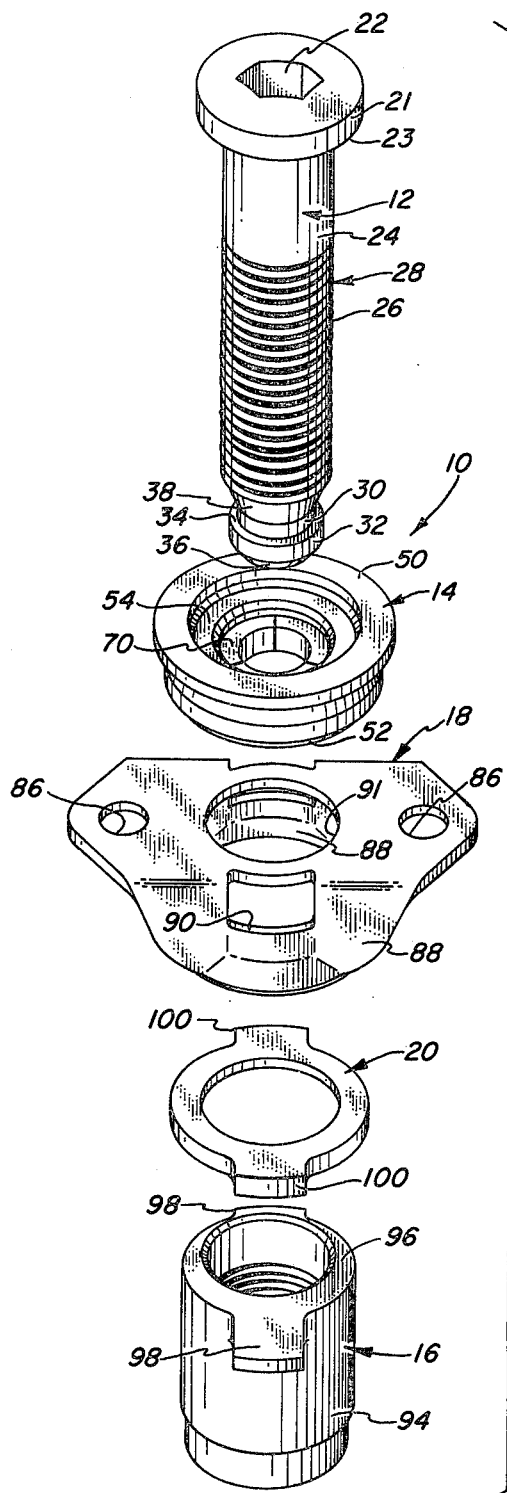
FIG. 1
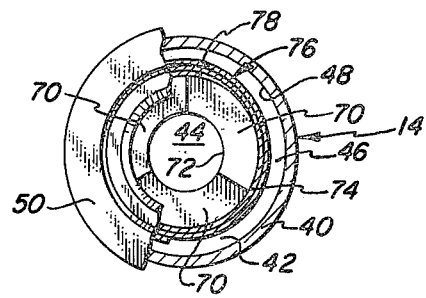
FIG. 2
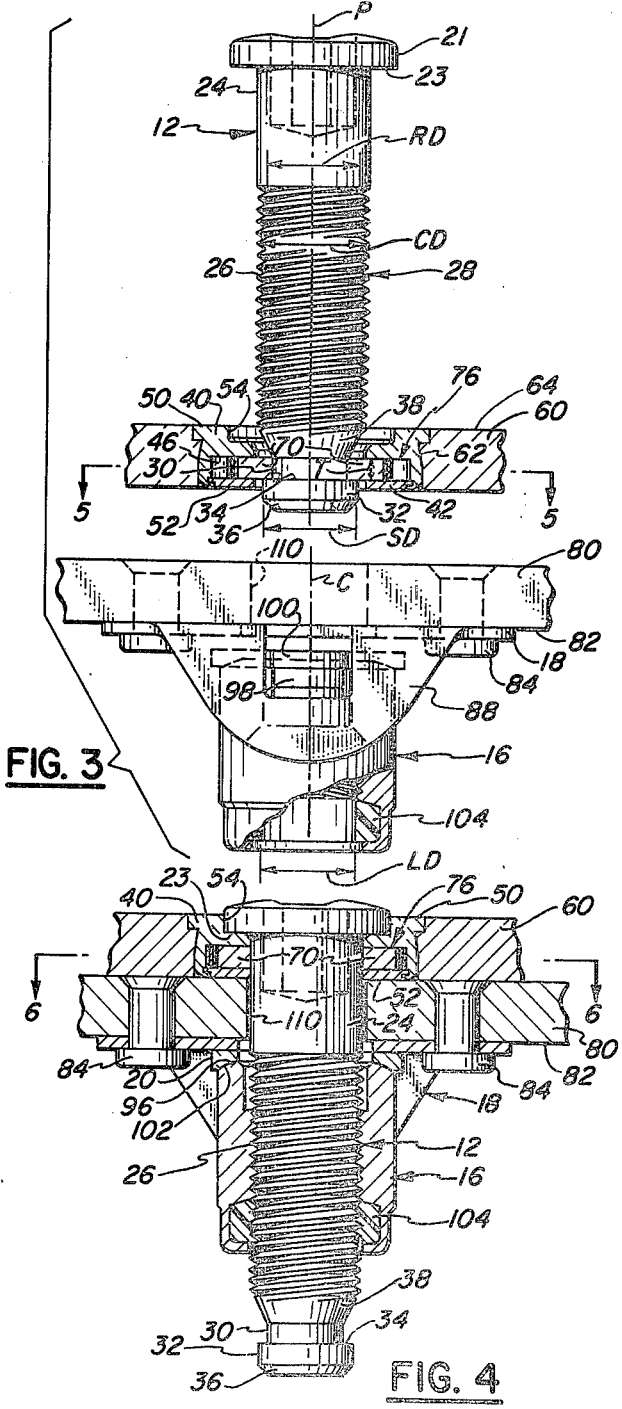
FIG. 3
FIG. 4

ACCESS PANEL FASTENER

This is a continuation of application Ser. No. 635,699, filed Nov. 26, 1975, and now abandoned.

The present invention relates generally to fasteners and pertains, more specifically, to improvements in access panel fasteners in which a threaded fastener element is captured in an outer access panel for cooperative engagement with a complementary threaded element affixed to an inner structure.

Access panel fasteners of the type designed for use in aircraft and other structures wherein the access panels themselves are stressed by virtue of carrying part of the load on the structure have found wide commercial acceptance. Such fasteners enable quick action for ready opening of the panels in order to gain access to various components carried beneath the panels and easy return of the panels to the closed condition.

Because the panels themselves are so stressed, the fasteners are subjected to considerable stress. Moreover, when the panels are opened the stresses in the structure are re-distributed, causing shifts in the relative location of the complementary portions of each fastener. Thus, the fasteners must be capable not only of handling the extraordinary stresses associated with the forces transmitted to the panels, but they must attain quick action while accommodating various degrees of misalignment arising from rearranged stresses upon opening of the panels. Furthermore, complementary portions of the fasteners must be captured in the panel and the understructure so as to enhance rapid operations while precluding inadvertent loss of one or the other of the component parts of the fastener.

Prior fasteners largely have been successful in attaining quick action and in providing requisite strength. However, difficulties have been encountered in re-connecting the complementary fastener components upon closing of the panels, due to misalignments and a tendency for those fastener portions which are captured in the panels themselves to break loose from their captive arrangement, thereby defeating the effectiveness of the quick action features. In overcoming such difficulties, it has been found that each fastener element which is captured in a panel must be held more positively and more firmly in a rearmost position wherein the fastener element projects outwardly from the panel when disconnected from the complementary fastener element in the inner structure. Moreover, the arrangement which retains the fastener element in such a hold-out position must generate a minimal amount of wear or other damage in that fastener element during use in order to maintain sufficiently long service life. Furthermore, it would be advantageous, both from the standpoint of optimum performance and long service life, to have available an access panel fastener which makes use of a self-locking mechanism of the type which employs a member of synthetic resin material, such as a collar, for establishing the requisite locking torque.

It is, therefore, an object of the invention to provide an access panel fastener in which a fastener element is captured positively in the panel and, when the panel is open, is held positively and firmly in a hold-out position, wherein the fastener element projects outwardly from the panel, so as not to interfere with proper seating of the panel as it is closed and as the fasteners are re-connected.

Another object of the invention is to provide an access panel fastener in which a fastener element is positively captured in the panel, but maintains the ability to move axially and to rotate to enable threaded connection to a complementary fastener element affixed to the understructure, while having the ability to rock about the axial direction so as to enable probing for the complementary fastener element and thereby accommodate misalignments as the fastener elements are being engaged.

Still another object of the invention is to provide an access panel fastener in which the fastener element which is captured in the panel is retained therein by a retainer which holds the fastener element firmly in the hold-out position with a holding action that is gentle enough to permit axial movement of the fastener element with minimal wear or other damage.

A further object of the invention is to provide a retainer for an access panel fastener of the type described above, the retainer employing a plurality of discrete retaining members and separate resilient means for resiliently biasing the retaining members into retaining relationship with a fastener element so that the retaining members and resilient means can each be provided with an appropriate configuration for optimum performance.

A still further object of the invention is to provide an access panel fastener having a structure which enables the employment of a reliable, effective self-locking feature in the form of a member, such as a collar, of synthetic resin material between the engaged fastener elements.

Another object of the invention is to provide an access panel fastener having a relatively long service life.

The above objects, as well as still further objects and advantages, are attained by the present invention which may be described briefly as providing, in an access panel fastener for securing an outer panel to an inner structure, a ring-like retainer including opposite faces, and a threaded fastener element having an axially extending external surface for reception within a generally complementary portion of the retainer, the retainer and fastener element external surface having means for capturing the fastener element within the complementary portion of the retainer while permitting the selective axial displacement of the fastener element relative to the retainer between a first position, wherein the fastener element projects from one of the opposite faces, and a second position, wherein the fastener element projects from the other of the opposite faces, the capturing means and the external surface including means for positively releasably retaining the fastener element at the first position, the means for positively retaining the fastener element at the first position including a groove establishing a shoulder in the external surface of the fastener element adjacent one end thereof, a plurality of discrete retaining members carried by the retainer for radial movement into and out of the groove and into and out of juxtaposition with the shoulder, and resilient means in the retainer for biasing each of the discrete retaining members radially inwardly, independent of one another into the groove and into juxtaposition with the shoulder. Where the threaded fastener element includes an external thread having a crest diameter, the groove and the shoulder have a diameter less than the crest diameter, and the access panel fastener can include a complementary threaded fastener element having an internal thread and a member of synthetic resin material having an internal dimension less than the crest diameter of the external thread of the first threaded fastener element.

The invention will be more fully understood, while still further objects and advantages will become apparent, in the following detailed description of preferred embodiments illustrated in the accompanying drawing, in which:

FIG. 1 is an exploded perspective view of component parts of an access panel fastener constructed in accordance with the invention;

FIG. 2 is a plan view of the retainer of the access panel fastener of FIG. 1, partially broken away to show internal component parts;

FIG. 3 is an elevational view, partially sectioned, illustrating the access panel fastener installed, but unfastened;

FIG. 4 is an elevational view similar to FIG. 3, but fully sectioned and with the fastener fastened;

Figure 5:
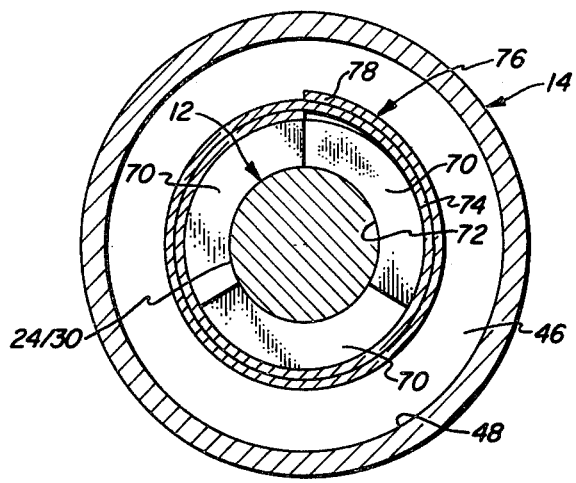
FIG. 5 is an enlarged cross-sectional view taken along line 5—5 of FIG. 3.

Referring now to the drawing, and especially to FIG. 1 thereof, an access panel fastener constructed in accordance with the invention is illustrated generally at 10 and is seen to comprise a first threaded fastener element in the form of a stud 12, a stud retainer in the form of an annular retainer assembly 14, a second threaded fastener element in the form of a nut 16, a nut retainer in the form of a basket 18 and a self-aligning base plate 20.

Stud 12 has a head 21 at one end thereof with a wrenching arrangement shown in the form of a hexagonal wrenching socket 22 and a seating surface 23. A shank 24 extends axially from the head 21 and includes an external thread 26, having a root diameter RD and a crest diameter CD (see FIG. 3), in the external surface 28 of the stud. Adjacent the other end of the stud, the external surface 28 includes a portion of reduced diameter having an annular groove 30 and a lip 32 establishing a radial shoulder 34 confronting the groove 30 and having an overall diameter SD. Lip 32 terminates in a tapered surface portion 36. A further tapered surface portion 38 is located between thread 26 and groove 30.

Stud 12 is to be retained in the access panel by means of the annular retainer assembly 14. Turning now to FIGS. 2 through 4, as well as to FIG. 1, retainer assembly 14 is ring-like in configuration and has an annular body member 40 to which there is assembled and affixed an annular ring member 42, the body member 40 and ring member 42 establishing an aperture 44 passing axially through the retainer assembly 14 and an annular cavity 46 having an outer boundary surface 48 and an inner boundary coincident with the aperture 44. The retainer assembly includes an outer face 50 on body member 40 and an opposite inner face 52 on ring member 42. In the illustrated embodiment, the outer face 50 includes a counterbore 54 complementary to the seating surface 23 of stud 12.

Stud 12 is to be captured in an access panel by means of the retainer assembly 14. In this instance, the retainer assembly 14 is affixed to an access panel 60 by means of a self-clinching configuration 62 provided around the outer periphery of the body member 40, in a manner now well-known in the art. When the retainer assembly 14 is installed in the access panel 60, outer face 50 preferably is flush with the corresponding outer surface 64 of the access panel.

Once the retainer assembly 14 is installed in the access panel 60, the stud 12 is captured in the retainer assembly by inserting the stud into the aperture 44 of the retainer assembly, as seen in FIG. 3. In addition to the groove 30 and corresponding shoulder 34 on stud 12, the means for capturing the stud within the retainer assembly includes a plurality of discrete retaining members shown in the form of individual jaws 70 located in the cavity 46 of the retainer assembly and carried therein for radial movement relative to the assembled body member 40 and ring member 42. Each jaw 70 is in the form of a segment of a generally annular configuration including a radially inner surface 72 having a first contour configuration and a radially outer surface 74 having a second contour configuration. Jaws 70 are received within cavity 46 for radial sliding movement and have an axial thickness T complementary to the axial extent of the cavity 46. Jaws 70 are biased radially inwardly by resilient means in the form of a cochlear spring 76 extending around the outer periphery of the jaws. The term "cochlear" is employed herein to denote the particular spring configuration wherein a relatively long, thin element of spring material is turned in overlapping coils 78, the adjacent coils of the spring being contiguous with one another and lying generally in the same radial plane, with the innermost coil wrapped around the jaws and the outermost coil confronting the outer boundary surface 48 of cavity 46. Preferably, the coils 78 of the spring 76 have a rectangular cross-sectional configuration, as viewed in FIGS. 3 and 4, so that the confronting surfaces of contiguous coils can engage one another in intimate contact, for reasons which will be explained below.

Thus, insertion of stud 12 into aperture 44 of the retainer assembly is accomplished by passing the lip 32 downwardly into aperture 44 such that the tapered surface portion 36 bears against the inner surface 72 of each jaw 70 to move the jaws radially outwardly, against the biasing force of spring 76, until lip 32 passes jaws 70. Once the lip 32 passes jaws 70, the jaws will be biased into groove 30 and become seated therein to capture the stud within the retainer assembly by virtue of the juxtaposition of the jaws with shoulder 34. Outward movement (upward as viewed in FIG. 3) of the stud 12 will be permitted only until the radial shoulder 34 abuts the jaws 70.

Access panel 60 is to be attached to an inner structure, illustrated in FIGS. 3 and 4, in the form of understructure 80. Basket 18 is permanently affixed to the underside 82 of understructure 80, as by rivets 84 which pass through rivet holes 86 in the basket 18 and secure the basket to the understructure. The basket 18 includes a pair of depending ears 88, each ear having a slot 90 passing therethrough, the ears being located diametrically opposite to one another with an opening 92 (see FIG. 1) in the basket lying between the ears.

The nut 16 has a nut body 94 including an uppermost surface 96 and a pair of diametrically opposed tabs 98 at the uppermost surface 96. The self-aligning base plate 20 has a pair of diametrically opposed tabs 100 corresponding to tabs 98 of nut 16. Tabs 98 and 100 are inserted into slots 90 to attach the nut to the basket and to place the base plate 20 between the uppermost surface 96 of the nut and the underside 82 of understructure 80. Uppermost surface 96 has a convex spherical surface configuration and base plate 20 is provided with a complementary surface 102 (see FIG. 4) having a concave spherical surface configuration to enable nut 16 to rock relative to basket 18, and relative to understructure 80, so as to facilitate self-alignment during engagement of the stud 12 with the nut 16.

Nut 16 is provided with an exceptionally effective and long-lived self-locking device in the form of a member of synthetic resin material having an internal dimension less than the crest diameter CD of thread 26 of stud 12. Preferably, the member is an annular collar 104 fabricated of a sintered polyamide material, such as that available commercially under the name Vespel. The inside diameter LD of collar 104 is less than the crest diameter CD of the thread 26 of stud 12 so that engagement of thread 26 with the collar 104 will establish the appropriate locking torque to maintain the stud and nut in assembled relationship. The locking mechanism provided by collar 104 is particularly effective in maintaining the stud and nut assembled in environments where vibration must be withstood.

Referring now to FIGS. 3 and 4, it will be seen that the stud 12 is always positively retained within the retainer assembly 14 by virtue of the engagement of jaws 70 with the external surface 28 of the stud. When the access panel 60 is open; that is, when the stud 12 is disengaged from the nut 16 and the access panel 60 is raised from understructure 80, as seen in FIG. 3, jaws 70 grip the external surface 28 of shank 24 and tend to maintain the stud in axial alignment, i.e., generally perpendicular to the access panel, while still permitting rotation of the stud 12 relative to retainer assembly 14. However, jaws 70 have sufficient radial travel, and spring 76 has sufficient resiliency to permit such travel, to enable probing for the nut 16 by limited rocking of the stud 12 about the perpendicular axis P relative to retainer assembly 14 to accommodate misalignments between axis P and the central axis C of aperture 110 in understructure 80.

Jaws 70 coact with external surface 28 of shank 24 to enable axial movement of the stud 12 between a first position, as illustrated in FIG. 3, wherein the stud 12 projects from the outer face 50 of retainer assembly 14 to extend outwardly from access panel 60, and a second position, as illustrated in FIG. 4, wherein the stud projects from the inner face 52 of retainer assembly 14 to extend in securing engagement with nut 16, with seating surface 23 bearing down to hold access panel 60 in place against understructure 80.

The stud 12 is positively retained in the first position (FIG. 3) by virtue of the seating of jaws 70 within the groove 30 and the juxtaposition of the jaws with shoulder 34 of lip 32. This "hold-out" position is quite advantageous in that it enables closing of the access panel without interference from any inwardly protruding studs which could interfere with the proper seating and registration of the access panel upon the understructure during closing, particularly where the access panel is curved. Furthermore, such an inwardly protruding stud could be damaged or even driven out of captivity in the access panel by attempts to close the access panel rapidly against such protruding studs.

When the access panel 60 is to be closed against understructure 80 and the stud 12 is to be engaged with nut 16, as seen in FIG. 4, the stud must be moved axially through the aperture 44 in retainer assembly 14. Such axial movement is permitted by the radial resiliency of spring 76 which allows the jaws 70 to move radially outwardly as further tapered surface portion 38 bears against the jaws. Further axial movement of the stud 12 requires that the thread 26 pass the jaws 70 as engagement of the stud 12 with nut 16 continues.

Proper operation and long service life depend upon the ability of the jaws 70 to enter groove 30, engage the external surface 28 of stud 12 in the hold-out position with sufficient retention force to maintain that position, and present a barrier to shoulder 34 sufficient to maintain the stud in captivity within the retainer assembly, coupled with the ability of the jaws to be retracted and pass over the thread 26, during axial movement of the stud, with minimal wear or other damage to the thread 26, as well as other portions of the stud. Because the overall diameter SD of lip 32 and shoulder 34 must be less than the inside diameter LD of the locking collar 104 to enable the lip to pass through the collar without damage to the collar, it follows that the overall diameter SD of lip 32 and shoulder 34 must be less than the crest diameter CD of thread 26. Since the diameter of the stud 12 at groove 30 must be less than the overall diameter SD of the lip 32 and shoulder 34, the diameter at the groove must also be less than the crest diameter CD of thread 26. Thus, the jaws 70 must have the ability not only to move radially a distance great enough to accommodate the above dimensional limitations, but must be biased radially inwardly with a force which is great enough to attain proper retention when the jaws are at the radially inner location, as seen in FIG. 3, yet gentle enough to preclude deleterious effects on the thread 26 when the jaws are at the radially outer location, as seen in FIG. 4.

Figure 6:
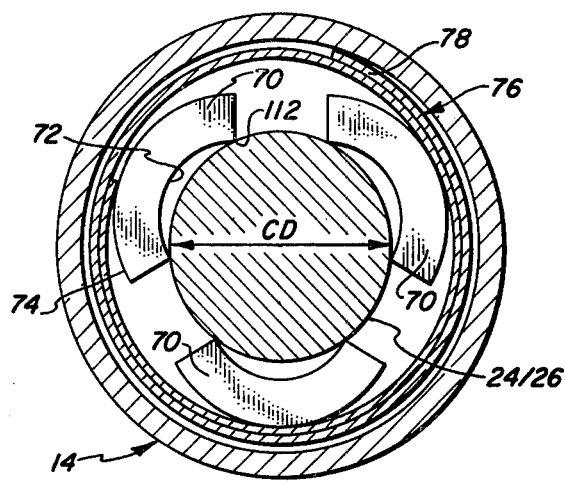
FIG. 6 is an enlarged cross-sectional view taken along line 6—6 of FIG. 4.

Because the jaws 70 are discrete members which can move radially independent of one another, each can be given a configuration best suited for maximum retention and minimal deleterious effects upon the stud. Because the spring 76 is an element separate from the jaws 70, it too may be given a configuration best suited to the above requirements. Thus, referring to FIGS. 5 and 6, the radially inner surface 72 of each jaw 70 has a contour configuration in the form of a segment of a circle, which segment follows a circle having a diameter equal to the diameter of the stud 12 at groove 30. In this manner, the jaws 70 engage the external surface 28 of stud 12 at the groove 30 along the peripheral length of each inner surface 72 for maximum retention. Spring 76 is wrapped around the radially outer surfaces 74 of the jaws and is in intimate contact with outer surfaces 74 for maximum radially inward biasing force. In addition, the intimate contact between the overlapping coils 78 of the spring 76 produces frictional forces which reinforce the inward biasing force. Sufficient clearance is provided between the jaws and the outer boundary surface 48 of the cavity 46 to enable radially outward displacement of the jaws 70, to the location seen in FIG. 6. When the jaws 70 are in the radially outer location, as seen in FIG. 6, edges 112 of inner surfaces 72 will engage the stud 12 and, since the edges 112 extend axially and parallel to the stud 12 over the axial thickness T of the jaws 70, the edges 112 will ride over the crest of the thread 26 without deleterious effects. Moreover, as the spring 76 opens, the area of the overlapping portions of the contiguous coils 78 decreases, thereby decreasing the frictional forces with a concomitant reduction in inward biasing force. Furthermore, unlike split-rings and like spring devices often found in the prior art, which absorb deflection only at a limited portion diametrically opposite to the split, spring 76 absorbs deflection along the entire length of the spring. Thus, stresses within the spring are lowered and a longer service life is attained. It has been found that optimum results are attained where spring 76 makes a minimum of about two turns around the jaws 70. While the total number of jaws may be varied, it has been found that three jaws combine effective operation with ease of manufacture.

In order to illustrate the improved longevity attained with the present invention, it is pointed out that industry standards for conventional access panel fasteners have tolerated as little as two-hundred-fifty reuses. A total of five hundred reuses has been considered exceptional performance. Access panel fasteners constructed in accordance with the present invention have withstood 1,500 reuses.

Figure 7:
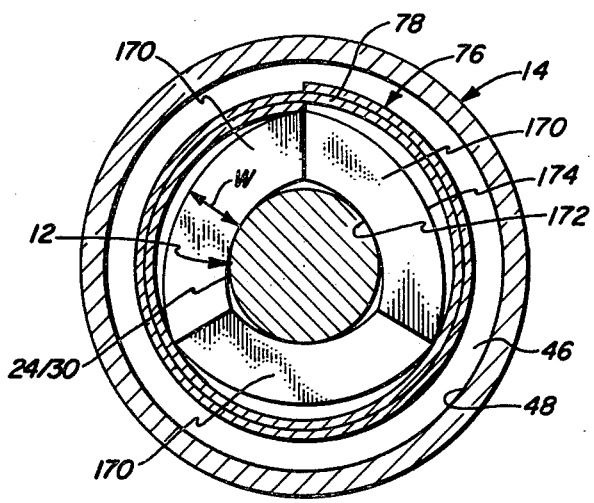
FIG. 7 is an enlarged cross-sectional view similar to FIG. 5, but showing an alternate configuration.
Figure 8:
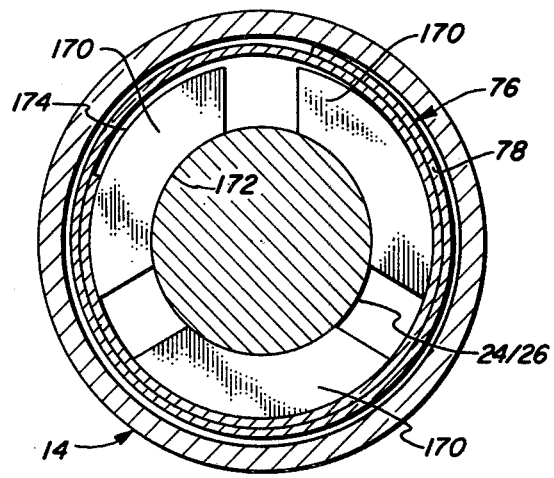
FIG. 8 is an enlarged cross-sectional view similar to FIG. 6, but showing the alternate configuration of FIG. 7.
Figure 9:
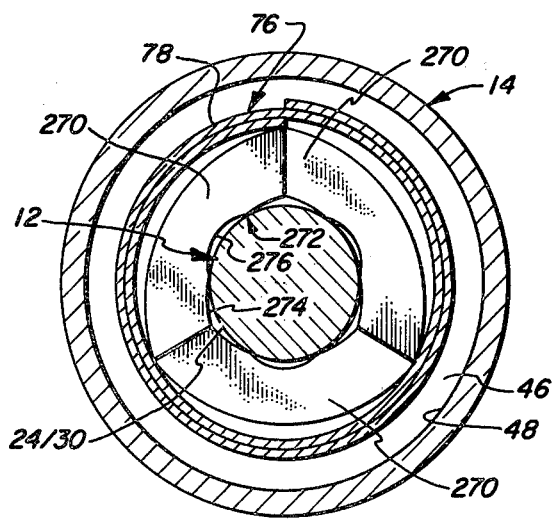
FIG. 9 is an enlarged cross-sectional view similar to FIG. 5, but showing another alternate configuration.
Figure 10:
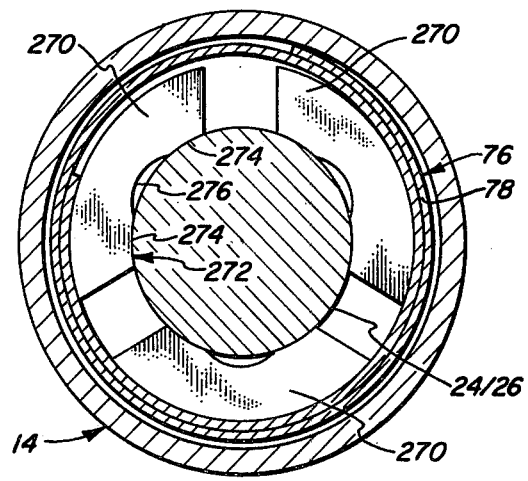
FIG. 10 is an enlarged cross-sectional view similar to FIG. 6, but showing the alternate configuration of FIG. 9.

Turning now to FIGS. 7 and 8, an alternate configuration for the jaws is illustrated at 170. Here, each radially inner surface 172 is provided with a contour configuration complementary to the thread 26. Thus, each radially inner surface 172 is in the form of a segment which follows a circle having a diameter equal to the crest diameter CD of the thread 26 of the stud 12. In this manner, the jaws 170 engage the thread 26 all along the inner surfaces 172, as seen in FIG. 8, so that the stresses at the thread 26 are lowered, with a concomitant reduction of thread wear. Although some retention strength is sacrificed, due to the departure of inner surfaces 172 from the outer surface 28 of the stud 12 when the jaws 170 are seated in groove 30, as seen in FIG. 7, sufficient retention strength remains available for proper operation of the device. In order to maintain a radial width W in each jaw sufficient to assure that each jaw 170 remains assembled with body member 40 and ring member 42 of the retainer assembly 14, within the confines of cavity 46, during use, the radially outer surface 174 of each jaw 170 is provided with a contour configuration approximately complementary to the outer boundary surface 48 of cavity 46; that is, each outer surface 174 is a segment which follows a circle having a diameter approximately the same as the diameter of outer boundary surface 48.

Where the advantages of the configuration of jaws 170 are desired, but retention strength must be increased, the jaw configuration can be modified further as shown in FIGS. 9 and 10. Here, each jaw 270 is provided with a radially inner surface 272 having a contour configuration including first portions 274, which are complementary to the outer surface 28 of the stud 12 along the thread 26, and a second portion in the form of a recess 276 located between first portions 274 and recessed therefrom. In this manner, retention strength is increased at the hold-out position of the stud, since recess 276 enables a greater portion of each jaw 270 to enter groove 30 and thus present a greater barrier to shoulder 34, as seen in FIG. 9, while thread wear is reduced by virtue of the lowered stresses attained through contact between the jaws 270 and the thread 26 of stud 12 along the first portions 274 of the inner surfaces 272 of the jaws, as seen in FIG. 10.

Thus, it will be seen that an access panel fastener 10 has been provided which makes use of an externally threaded stud 12 engaging a nut 16 which carries a reliable self-locking mechanism in the form of a member of synthetic resin material, preferably in the form of annular collar 104. The particular retainer assembly 14 which makes use of a plurality of discrete jaws 70, 170 or 270 biased inwardly by a separate, preferably cochlear spring 76 enables the stud to be captured and effectively retained while being movable between the hold-out position (FIG. 3) and the securing position (FIG. 4) without damage to the external thread 26 of the stud, the relatively large radial displacements permitted the jaws enable the jaws to extend into the groove 30 of the stud so as to be juxtaposed with the shoulder 34 for effective retention of the stud within the retainer assembly, the large radial displacements being necessitated by the limited radial extent of the shoulder, which must pass through the collar 104 without damaging the collar. The gentle inward biasing force on the jaws minimizes the stresses placed on the external thread by the jaws and thus reduced wear and damage to the thread to a minimum. Longer useful life is assured by the reduction of wear and damage to the stud, as well as the high re-use capability of the self-locking mechanism provided by the collar 104 of synthetic resin material.

It is to be understood that the above detailed description of embodiments of the invention are provided by way of example only. Various details of design and construction may be modified without departing from the true spirit and scope of the invention, as set forth in the appended claims.

The embodiments of the invention in which an exclusive property or privilege is claimed are defined as follows:

1. In an access panel fastener for securing an outer panel to an inner structure:
   a ring-like retainer including opposite faces; and
   a threaded fastener element having an axially extending external surface for reception within a generally complementary portion of the retainer;
   said retainer and fastener element external surface having means for capturing the fastener element within the complementary portion of the retainer while permitting selective axial displacement of the fastener element relative to the retainer between a first position, wherein the fastener element projects from one of the opposite faces, and a second position, wherein the fastener element projects from the other of the opposite faces, said capturing means and said external surface including means for positively releasably retaining the fastener element at said first position;
   said means for positively retaining the fastener element at said first position including an annular groove establishing a radial annular shoulder in the external surface of the fastener element adjacent one end thereof;
   a plurality of similar discrete retaining members carried by the retainer, each said member having a radially outer surface and a radially inner portion terminating in a concave inner surface generally complementary to the bottom of the groove, said retaining members being adapted for radial movement between outer positions in which said retaining members are not in said groove and inner positions in which the radially inner portion of each said retaining member is in said groove in juxtaposition with said shoulder; and resilient means in said retainer, said resilient means comprising a cochlear spring surrounding the discrete retaining members and in engagement with said radially outer surfaces of the retaining members for biasing each of the discrete retaining members radially inwardly, independent of one another, into said groove, and into juxtaposition with said shoulder, the overlapping coils of said spring being in intimate contact with each other at all operative positions.

2. The invention of claim 1 including three discrete retaining members.

3. The invention of claim 2 wherein the cochlear spring includes a minimum of approximately two turns around the retaining members when the radially inner portions of said retaining members are in said groove.

4. The invention of claim 3 wherein the cochlear spring has a rectangular cross-sectional configuration.

5. The invention of claim 1 wherein:

said threaded fastener element includes an external thread on said external surface, the thread having a root diameter and a crest diameter; and the diameter of said shoulder is smaller than the crest diameter of the thread and the diameter of said groove is smaller than the diameter of said shoulder;

the magnitude of the radial movement of the retainer members being great enough to assure seating of the radially inner portions of the retainer members in the groove and juxtaposed with the shoulder when the fastener element is in the first position thereof and the retainer members are in a radially inward location, but enabling the crest diameter of the thread to pass the retainer members as the fastener element is displaced toward the second position thereof and the retainer members are moved to a radially outward location.

6. The invention of claim 5 including a complementary threaded fastener having:

an internal thread; and a collar of synthetic resin material having an internal diameter less than the crest diameter of the external thread of the first said threaded fastener element.

7. The invention of claim 5 wherein:

the retainer is generally annular and the generally complementary portion thereof includes an axially extending aperture;

the capturing means includes an annular cavity in the retainer, said cavity having a radially outer boundary surface and a radially inner boundary communicating with the aperture;

the pluarlity of discrete retaining members comprise a plurality of jaws located in the annular cavity, each jaw being in the form of a segment of generally annular configuration and including a generally convex radially outer surface.

8. The invention of claim 7 including a complementary threaded fastener having:

an internal thread; and a collar of synthetic resin material having an internal diameter less than the crest diameter of the external thread of the first said threaded fastener element.

9. The invention of claim 8 including three jaws.

10. The invention of claim 9 wherein the cochlear spring includes a minimum of approximately two turns around the jaws when the radially inner portions of said jaws are in said groove.

11. The invention of claim 10 wherein the cochlear spring has a rectangular cross-sectional configuration.

12. The invention of claim 8 wherein the concave inner surface of each jaw is complementary to the surface configuration of the fastener element at the groove thereof.

13. The invention of claim 8 wherein the convex outer surface of each jaw is approximately complementary to the outer boundary surface of the cavity.

14. The invention of claim 8 wherein the concave inner surface of each jaw is approximately complementary to the surface configuration of the fastener element at the crest diameter of the thread thereof.

15. The invention of claim 14 wherein the convex outer surface of each jaw is approximately complementary to the outer boundary surface of the cavity.

16. The invention of claim 15 including three jaws.

17. The invention of claim 16 wherein the cochlear spring includes a minimum of approximately two turns around the jaws when the radially inner portions of said jaws are in said groove.

18. The invention of claim 17 wherein the cochlear spring has a rectangular cross-sectional configuration.

19. The invention of claim 7 wherein the concave inner surface of each jaw includes first portions complementary to the surface configuration of the fastener element at the crest diameter of the thread thereof and a second portion between the first portions and recessed therefrom.

20. The invention of claim 19 wherein the convex outer surface of each jaw is approximately complementary to the outer boundary surface of the cavity.

21. The invention of claim 20 including three jaws.

22. The invention of claim 21 wherein the cochlear spring includes a minimum of approximately two turns around the jaws when the radially inner portions of said jaws are in said groove.

23. The invention of claim 22 wherein the cochlear spring has a rectangular cross-sectional configuration.

24. A ring-like retainer for use in an access panel fastener for securing a panel to a structure, said retainer comprising:

a generally annular body having an aperture extending therethrough and including an annular cavity communicating with the aperture;

a plurality of discrete retaining jaws located in the annular cavity for movement in radial directions extending into and out of said aperture, each being a segment of a generally annular configuration; and a cochlear spring surrounding said discrete jaws for biasing each of the jaws radially inwardly, the overlapping coils of said spring being in intimate contact with each other at all operative positions.

25. The invention of claim 24 including three jaws.

26. The invention of claim 25 wherein the cochlear spring includes a minimum of approximately two turns around the jaws when they are in the radially innermost position.

27. The invention of claim 26 wherein the cochlear spring has a rectangular cross-sectional configuration.

* * * * *